United States Patent
Hsiao et al.

(10) Patent No.: US 7,220,159 B2
(45) Date of Patent: May 22, 2007

(54) METHOD AND STRUCTURE OF CONVERGING ELECTRON-EMISSION SOURCE OF FIELD-EMISSION DISPLAY

(75) Inventors: Chun-Yen Hsiao, Guanyin Township, Taoyuan County (TW); Frank Yang, Guanyin Township, Taoyuan County (TW); Kuei-Wen Cheng, Guanyin Township, Taoyuan County (TW)

(73) Assignee: TECO Nanotech Co., Ltd., Taoyuan (TW)

( * ) Notice: Subject to any disclaimer, the term of this patent is extended or adjusted under 35 U.S.C. 154(b) by 261 days.

(21) Appl. No.: 10/934,591

(22) Filed: Sep. 3, 2004

(65) Prior Publication Data

US 2006/0049737 A1   Mar. 9, 2006

(51) Int. Cl.
*H01J 9/02* (2006.01)
*H01J 9/00* (2006.01)

(52) U.S. Cl. .............. 445/24; 313/495; 313/309; 313/311; 313/336

(58) Field of Classification Search .............. None
See application file for complete search history.

(56) References Cited

U.S. PATENT DOCUMENTS

| | | | |
|---|---|---|---|
| 6,426,590 B1 * | 7/2002 | Chung et al. | 313/496 |
| 6,617,798 B2 * | 9/2003 | Lee et al. | 315/169.3 |
| 6,705,910 B2 * | 3/2004 | Sheu et al. | 445/24 |
| 6,769,945 B2 * | 8/2004 | Chang et al. | 445/24 |
| 6,972,513 B2 * | 12/2005 | Shiratori et al. | 313/309 |
| 2004/0251813 A1 * | 12/2004 | Okai et al. | 313/495 |

* cited by examiner

*Primary Examiner*—Sikha Roy

(57) ABSTRACT

A method and a structure for a converging-type electron-emission source of a field-emission display are disclosed. A substrate is provided, and a silver paste is used to form a first electrode layer on the substrate by the process such as thick-film photolithography or screen-printing. A carbon nanotube is formed on the first electrode layer by thick-film photolithography or screen-printing, and a second electrode is formed on the carbon nanotube. A third electrode layer is formed on the first electrode layer around the second electrode layer by thick-film photolithography or screen-printing. The third electrode layer is higher than the second electrode layer, such that a converging exit is formed around the second electrode layer. A sintering step is performed. When the electron beam is generated, the electron beam is concentrated at the center of the converging exit to impinge a phosphor layer of an anode without causing gamut.

10 Claims, 5 Drawing Sheets

METHOD AND STRUCTURE OF CONVERGING ELECTRON-EMISSION SOURCE OF FIELD-EMISSION DISPLAY

BACKGROUND OF THE INVENTION

The present invention relates in general to a structure and a method for forming a converging-type electron-emission source of a field-emission display, and more particularly, to a method of forming a recessed region or a slot in a cathode structure and a carbon nanotube in the recessed region, such that the peripheral electrode layer protrudes over the electron-emission source. In addition, the protruding electrode layer forms the potential distribution to achieve converging effect of the electron beam.

In the conventional bipolar or tri-polar field-emission display having a carbon nanotube as an electron-emission source (as shown in FIGS. 1 and 2), the electrons are drained from the electron-emission source to impinge the phosphor layer of the anode, so as to excite the phosphor to illuminate. The configuration of the cathode and anode often causes the electron beams diverged due to the electric field. Sometimes the electron beams may even impinge the phosphor of the neighboring anode unit to cause gamut. The image display by such display is thus seriously degraded.

To resolve the electron-beam diffusion problem of the conventional bipolar or tri-polar field-emission display, tetra-polar (as shown in FIG. 3) or penta-polar field-emission display has been proposed. The tetra- or penta-polar field-emission display has a converging electrode layer in addition to the basic components of the bi- or tri-polar field-emission display. Therefore, the electron emission generated from the cathode can be focused or converged into a concentrated beam to precisely and sufficiently impinge the phosphor of the corresponding anode unit. Thereby, gamut is prevented to appear in the image.

The converging electrode layer formed between the cathode structure and the anode structure of a tetra-polar field-emission display provides a voltage to converge the electron beam. The fabrication process of this type of tetra-polar field-emission display includes forming a converging electrode layer on a gate electrode layer by photolithography, or forming a shadow mask between the cathode and anode structures to serve as the converging electrode layer. Either type of converging electrode layer does not only increase the complexity of fabrication, but also increase the material cost.

BRIEF SUMMARY OF THE INVENTION

It is therefore a substantial need for redesigning the cathode structure of a field-emission display without causing extra fabrication process and cost. The redesign of the cathode structure provides a converging electrode layer that does not require extra circuit control, while the fabrication process is simplified, and material cost is greatly reduced. By the redesign of the cathode structure as provided, the electron beam generated by the electron-emission source is converged and concentrated to precisely impinge the phosphor of the corresponding anode unit.

The method as provided includes forming a first electrode layer on a glass substrate, and a second electrode layer and a third electrode layer on the first electrode layer. The second electrode layer serves as an electron-emission layer surrounded by the third electrode layer. The third electrode layer is higher the second electrode layer, such that a converging opening is formed for the electrons generated by the second electrode layer.

The first and third layers are preferably fabricated from silver ink by thick-film photolithography or screen-printing process, and carbon nanotube is preferably used for forming the second electrode layer.

The cathode structure of a field-emission display as provided includes a first electrode, and a second electrode and a third electrode layers formed on the first electrode layers. The third electrode layer is higher than the second electrode layer and encompasses the second electrode layer therein. Thereby, a converging opening is formed by the electrode potential of the third electrode layer over the second electrode layer.

BRIEF DESCRIPTION OF THE DRAWINGS

The above objects and advantages of the present invention will be become more apparent by describing in detail exemplary embodiments thereof with reference to the attached drawings in which.

DETAILED DESCRIPTION OF THE INVENTION

Figure 1:
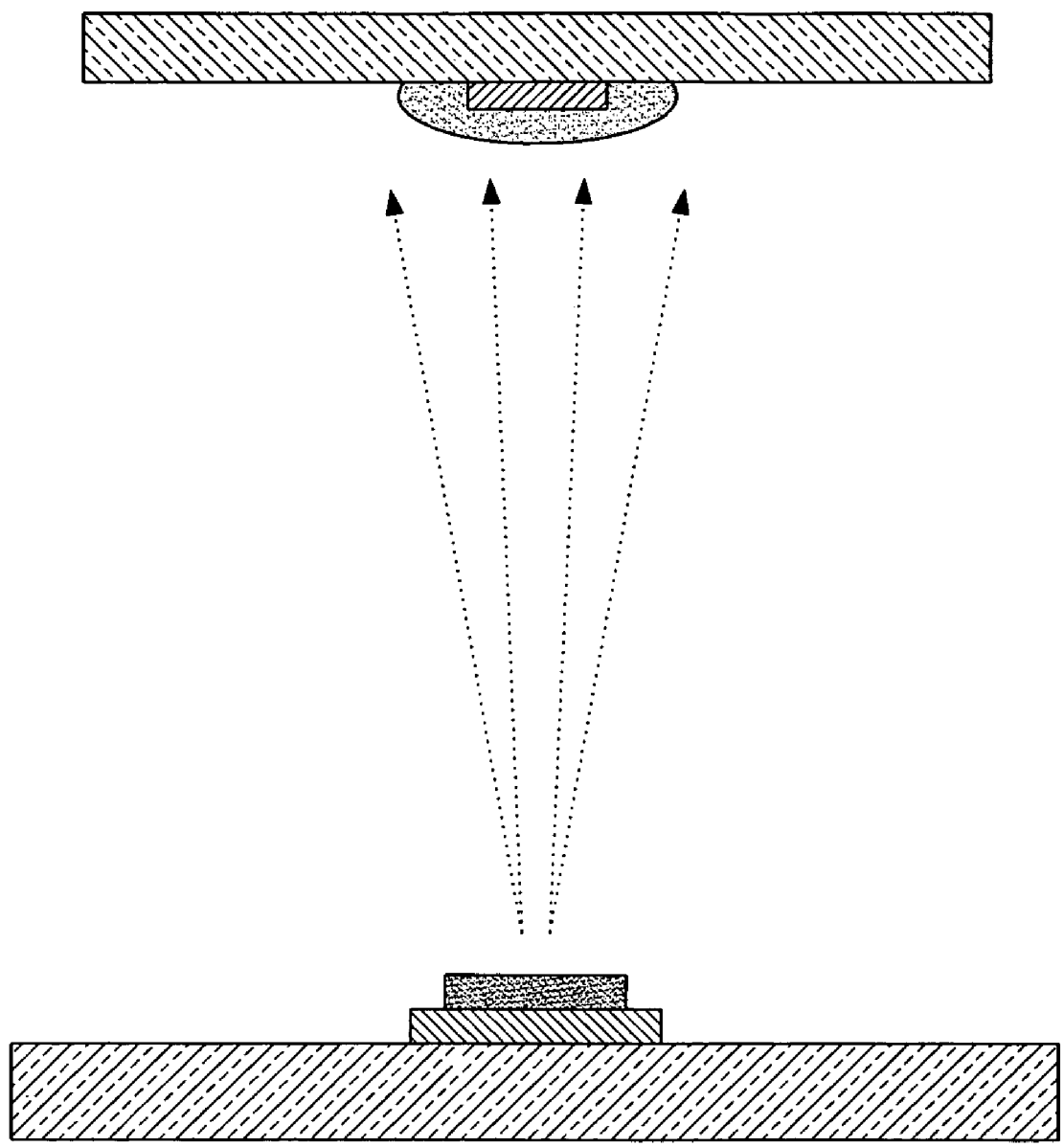
FIG. 1 shows a conventional bipolar field-emission display.
Figure 2:
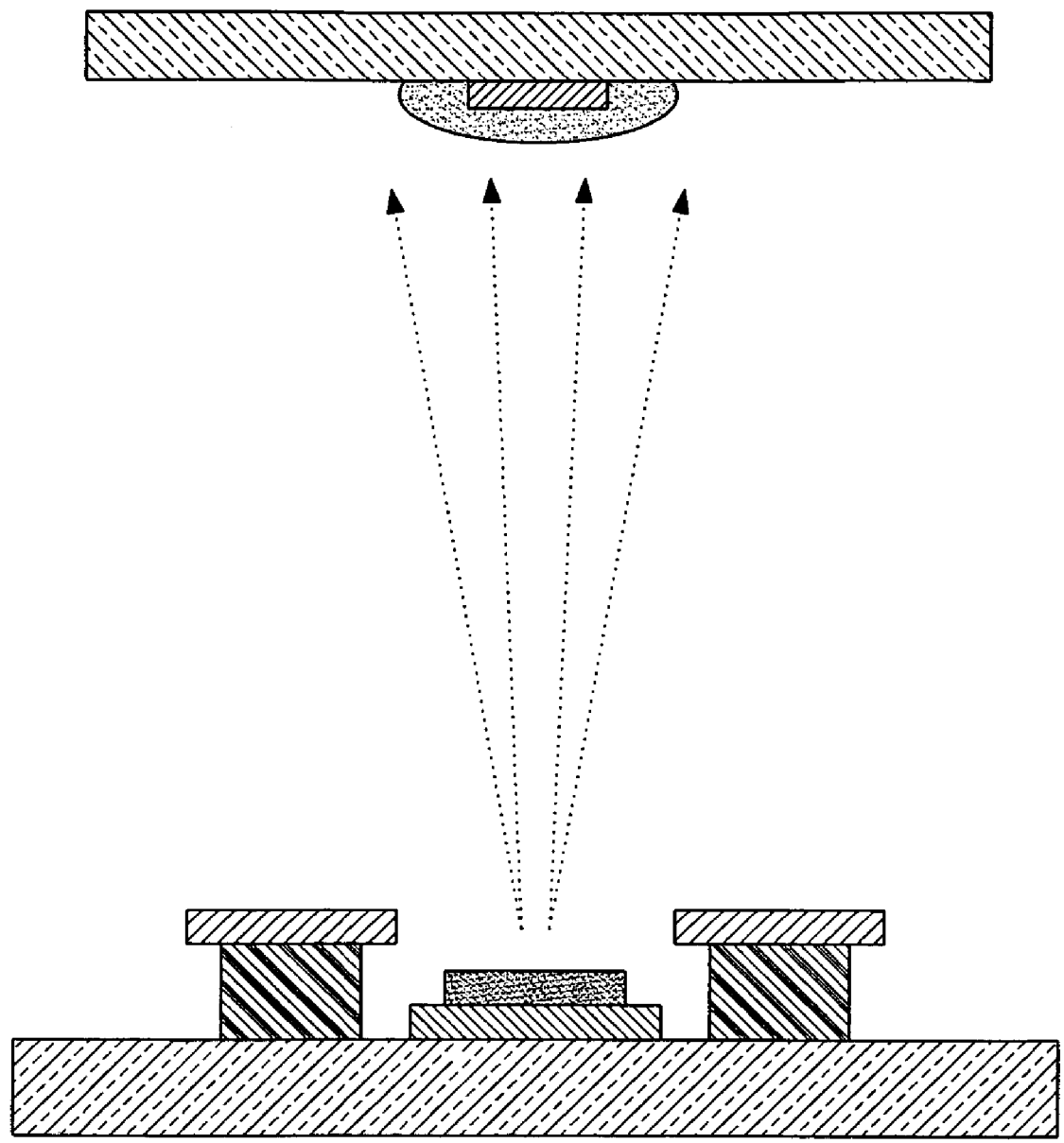
FIG. 2 shows a conventional tri-polar field-emission display.
Figure 3:
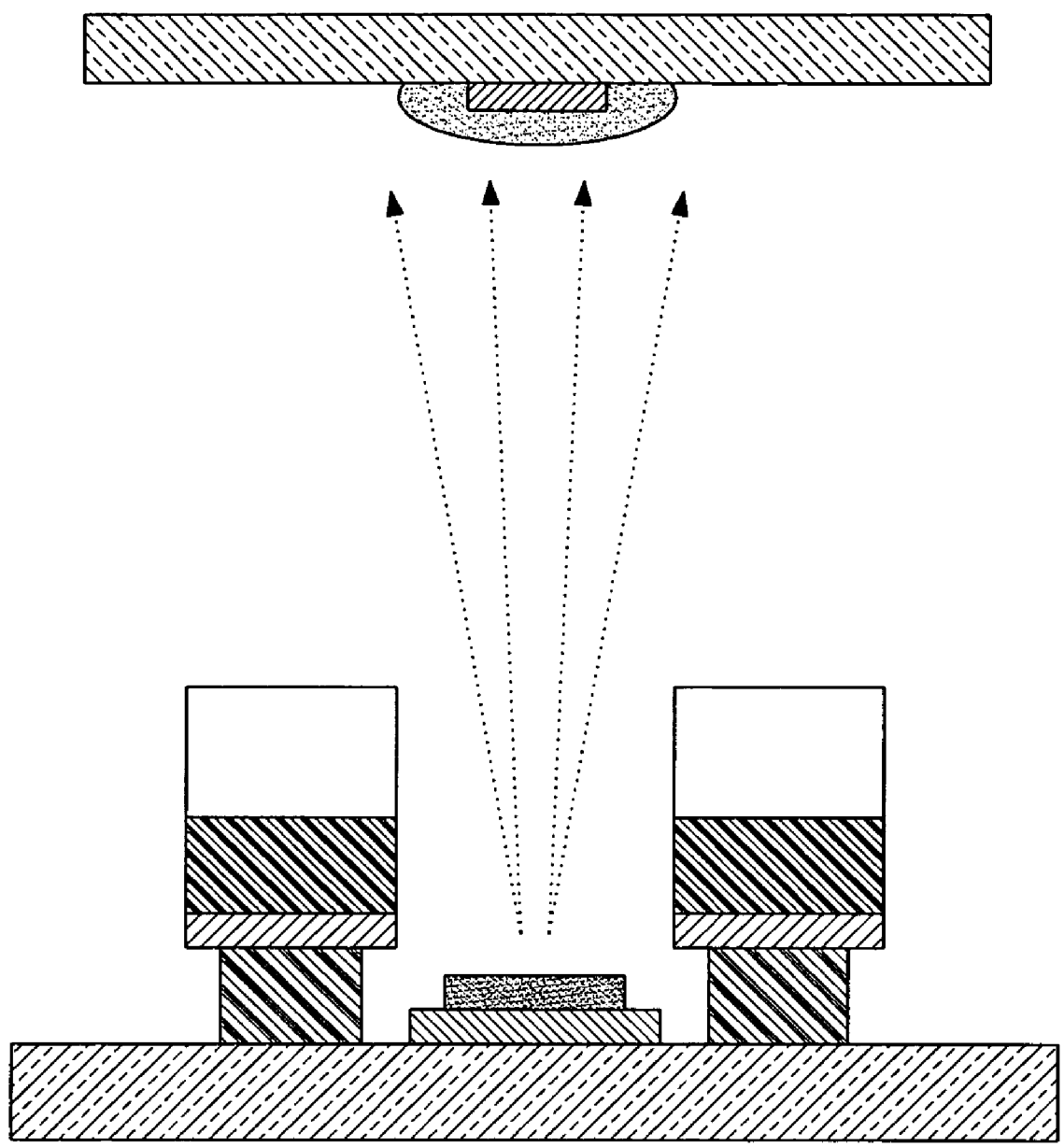
FIG. 3 shows a conventional tetra-polar field-emission display.
Figure 4:
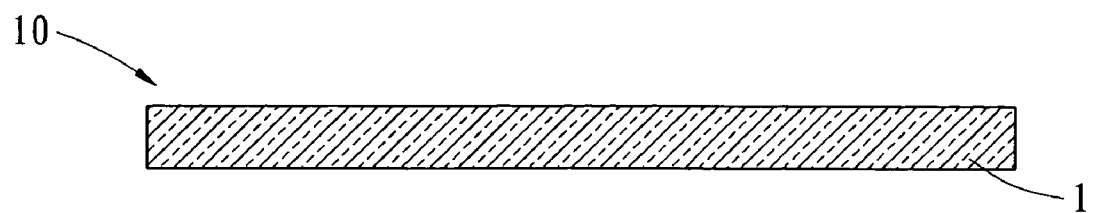
FIGS. 4-7 shows the fabrication process of a cathode structure of a field-emission display in one embodiment of the present invention.
Figure 5:
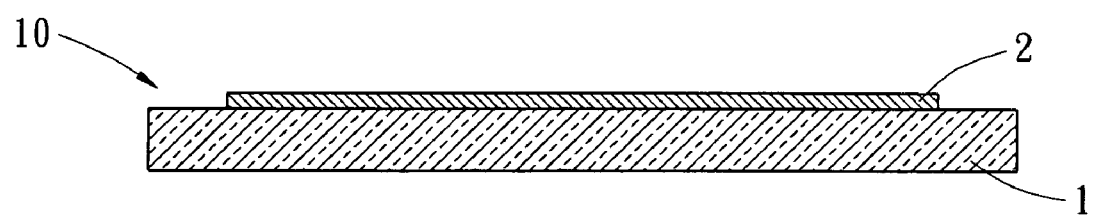
Figure 6:
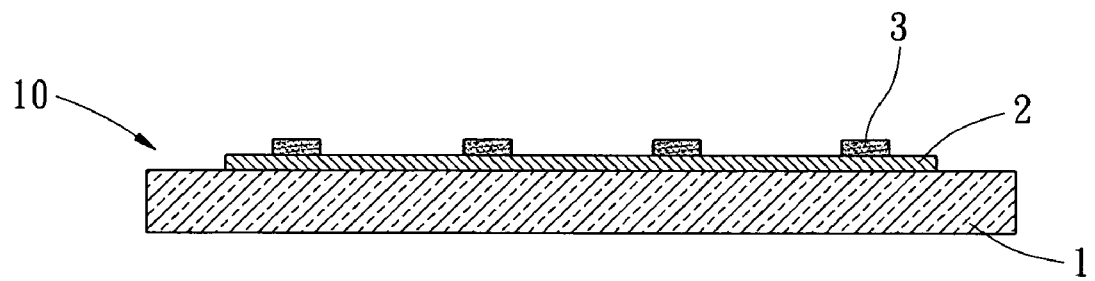
Figure 7:
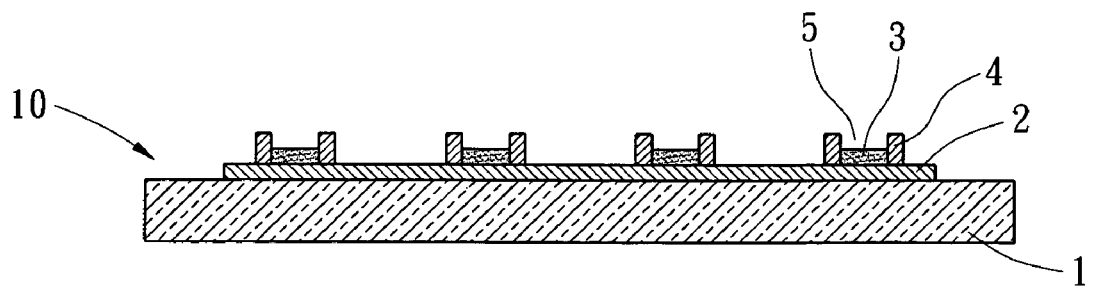

Referring to FIGS. 4-7, the fabrication process of the cathode structure of a field-emission display is illustrated. The fabricated process as provided includes a step of forming recessed region in the cathode structure, and a step of forming the electron-emission source in the recessed region. The electron-emission source includes carbon nanotube, for example. Thereby, the peripheral electrode layer on the periphery of the electron-emission source is higher than the electron-emission source, such that a potential distribution causes the electron beam generated by the electron-emission source to be converged.

While fabricating the cathode structure 10 of the field-emission display, a glass substrate 1 provided. A first electrode layer 2 is formed on the substrate 1. The method for forming the first electrode layer 2 includes thick-film photolithography or screen-printing. The thickness of the first electrode layer 2 is about 10 microns to 20 microns, and the material for forming the first electrode layer 2 includes silver paste, for example.

A second electrode layer 3 is then formed on the first electrode layer 2 by thick-film photolithography or screen-printing, for example. The material for forming the second electrode layer 3 is an electron-emission source such as a carbon nanotube, and the thickness of the second electrode layer is about one micron to about 5 microns, for example.

A thick-film photolithography process or a screen-printing process is performed to form a third electrode layer 4 on the first electrode layer 2. The third electrode layer 4 is formed encircling the second electrode layer 2 therein. Silver glue or ink can be used for forming the third electrode layer 4, for example. The thickness of the third electrode layer 4 is about 10 microns to about 40 microns. Therefore, a converging opening 5 is formed over the second electrode layer 3 encircled by the third electrode layer 4. The thickness of the third electrode layer 4 or the internal diameter of the converging opening 5 can be adjusted to optimize the converging effect.

When the third electrode layer 4 is formed, a sintering process is performed on the cathode structure 10.

Figure 8:
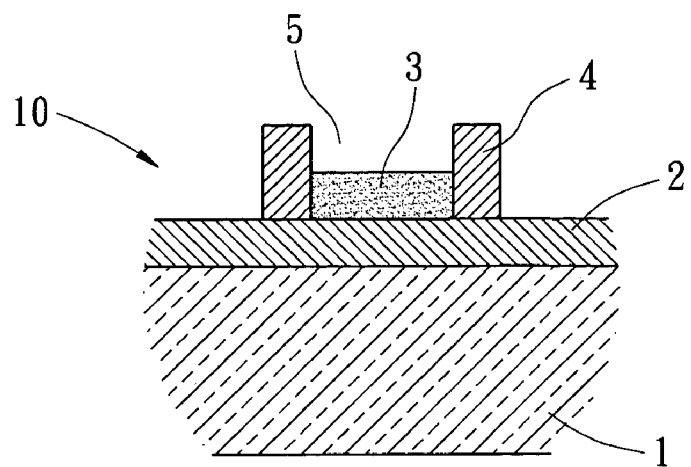
FIG. 8 shows the a single cathode unit of a field-emission display provided by the present invention.
Figure 9:
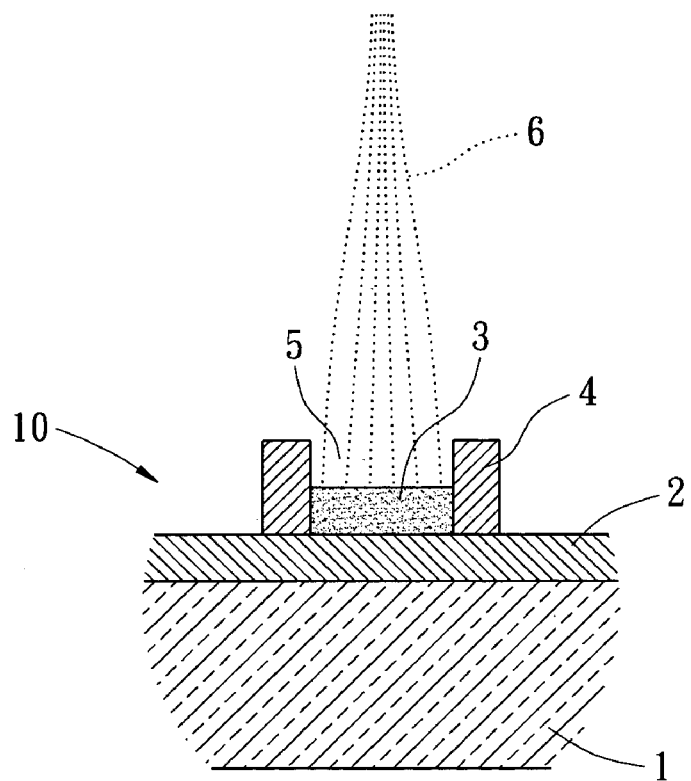
FIG. 9 shows the emission of electrons generated by the cathode structure of the field-emission display provided by the present invention.

FIGS. 8 and 9 show a single cathode unit and the electron beam generated by the cathode unit. As shown, the cathode unit is has a first electrode layer 2 formed on the glass substrate 1, a second electrode layer 3, which is an electron-emission layer, formed on the first electrode layer 2, and a third electrode layer 4 formed on the first electrode layer 2 surrounding the electron-emission layer 3. The third electrode layer 4 is higher than the second electrode layer 3, such that a converging opening 5 is formed by the third electrode layer 4 over the second electrode layer 3.

When a voltage is applied to the field-emission display 10 to excite an electron beam from the second electrode layer 3, the converging opening 5 formed by the third electrode layer 4 causes the electron beam to be concentrated, such that the electron beam can precisely impinge the phosphor layer of the corresponding anode unit without causing gamut.

Therefore, the electron-emission source of the field-emission display has at least the following advantages:

(1) Electrons drained form the electron source of the cathode structure are converged by the configuration of and electric field induced by the third electrode layer;

(2) The concentration effect is advantageous for providing uniform distribution of the electron beam; and (3) Low-cost thick-film process can be used for forming the converging-type electron emission source, such that the cost for fabricating the field-emission display can be reduced.

While the present invention has been particularly shown and described with reference to preferred embodiments thereof, it will be understood by those of ordinary skill in the art the various changes in form and details may be made therein without departing from the spirit and scope of the present invention as defined by the appended claims.

What is claimed is:

1. A manufacturing method for a converging-type cathode of a field-emission display, comprising the following steps in the order named:
    a) providing a substrate of the cathode;
    b) forming a first electrode layer on the substrate;
    c) forming a second electrode layer composed of a plurality of electron emission sources on the first electrode layer;
    d) forming a third electrode layer directly on the first electrode layer, the third electrode encircling each electron emission source of the second electrode layer and having a height higher than that of the second electrode layer;
    e) sintering the first, second and third electrode layers on the substrate.

2. The method of claim 1, wherein the substrate is made of glass.

3. The method of claim 1, wherein the first electrode layer is composed of silver ink.

4. The method of claim 1, wherein the first electrode layer has a thickness of about 10 to 20 microns.

5. The method of claim 1, wherein the second electrode layer is composed of carbon nanotubes.

6. The method of claim 1, wherein the second electrode layer has with a thickness of about 1 to 5 microns and the third electrode layer has a thickness of about 10 to 40 microns.

7. The method of claim 1, wherein the third electrode layer is composed of silver ink.

8. The method of claim 1, wherein the step b includes performing a thick-film process or a screen-printing process to form the first electrode layer.

9. The method of claim 1, wherein the step c includes performing a thick-film process or a screen-printing process to form the second electrode layer.

10. The method of claim 1, wherein the step d includes performing a thick-film process or a screen-printing process to form the third electrode layer.

* * * * *